United States Patent
Smith

(10) Patent No.: US 12,449,126 B2
(45) Date of Patent: Oct. 21, 2025

(54) INJECTING FUEL-STEAM MIXTURE INTO TURBINE ENGINE COMBUSTOR

(71) Applicant: Raytheon Technologies Corporation, Farmington, CT (US)

(72) Inventor: Lance L. Smith, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/120,840

(22) Filed: Mar. 13, 2023

(65) Prior Publication Data

US 2024/0310042 A1    Sep. 19, 2024

(51) Int. Cl.
    F23L 7/00        (2006.01)
    F23R 3/30        (2006.01)

(52) U.S. Cl.
    CPC ............... F23L 7/005 (2013.01); F23R 3/30 (2013.01)

(58) Field of Classification Search
    CPC .... F23R 3/30; F23R 3/286; F02C 3/30; F23L 7/005
    See application file for complete search history.

(56) References Cited

U.S. PATENT DOCUMENTS

| | | | |
|---|---|---|---|
| 2,447,696 A * | 8/1948 | Archibald | F02C 3/30 60/264 |
| 4,955,191 A | 9/1990 | Okamoto | |
| 5,372,008 A * | 12/1994 | Sood | F23D 14/78 60/737 |
| 5,983,622 A * | 11/1999 | Newburry | F23N 5/003 60/773 |
| 6,434,945 B1 * | 8/2002 | Mandai | F23D 17/002 60/39.463 |
| 7,451,602 B2 | 11/2008 | Marakovits | |
| 11,306,661 B1 | 4/2022 | Brightwell | |
| 2004/0219079 A1 * | 11/2004 | Hagen | F23C 6/02 422/607 |
| 2007/0044477 A1 * | 3/2007 | Held | F23R 3/36 60/776 |
| 2007/0101725 A1 * | 5/2007 | Marakovits | F23L 7/005 60/39.53 |

(Continued)

FOREIGN PATENT DOCUMENTS

| | | |
|---|---|---|
| DE | 19937921 B4 | 8/2010 |
| WO | 2023051864 A1 | 4/2023 |

OTHER PUBLICATIONS

G. Daniel Brewer, "Hydrogen Aircraft Technology," ISBN 0-8493-5838-8, © 1991 by CRC Press, Inc. (Year: 1991).*

(Continued)

*Primary Examiner* — David P. Olynick
(74) *Attorney, Agent, or Firm* — Getz Balich LLC

(57) ABSTRACT

An assembly is provided for a turbine engine. This assembly includes a combustor, a fuel injector nozzle and a fuel system. The combustor includes a combustion chamber. The fuel injector nozzle is configured to inject a fuel-steam mixture into the combustion chamber for combustion. The fuel system includes a fuel source, a steam source and a manifold. The manifold is configured to mix fuel received from the fuel source with steam received from the steam source to provide the fuel-steam mixture. The fuel system is configured to deliver the fuel-steam mixture to the fuel injector nozzle.

15 Claims, 7 Drawing Sheets

(56) References Cited

U.S. PATENT DOCUMENTS

| | | | | |
|---|---|---|---|---|
| 2010/0300109 | A1* | 12/2010 | Carroni | F23R 3/34 |
| | | | | 60/776 |
| 2012/0174590 | A1* | 7/2012 | Krull | F23R 3/286 |
| | | | | 73/112.01 |
| 2013/0074504 | A1* | 3/2013 | Baruah | F23N 5/003 |
| | | | | 60/742 |
| 2013/0098041 | A1* | 4/2013 | Zhang | F23K 5/005 |
| | | | | 60/734 |
| 2016/0273449 | A1* | 9/2016 | DiCintio | F23D 11/16 |
| 2017/0022898 | A1 | 1/2017 | Beadie | |
| 2017/0058769 | A1* | 3/2017 | Vandale | F02C 3/30 |
| 2021/0207500 | A1 | 7/2021 | Klingels | |
| 2022/0333783 | A1* | 10/2022 | Toqan | F01K 23/10 |

OTHER PUBLICATIONS

EP Search Report for EP Patent Application 24163166.2 dated Sep. 2, 2024.

* cited by examiner

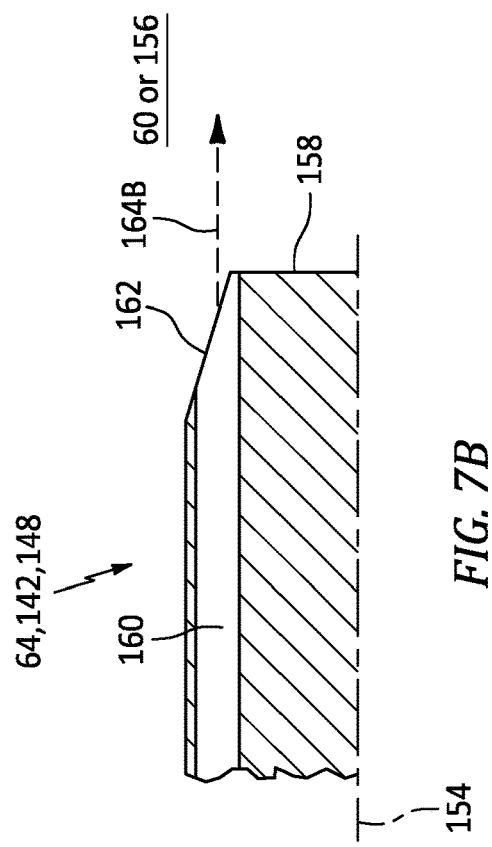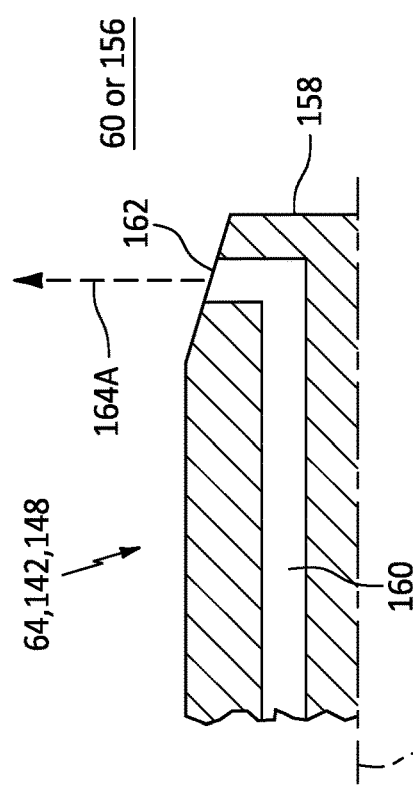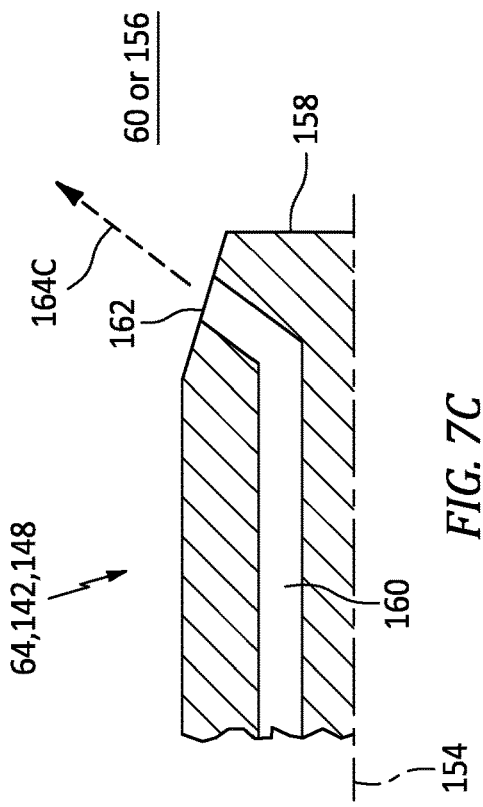

INJECTING FUEL-STEAM MIXTURE INTO TURBINE ENGINE COMBUSTOR

BACKGROUND OF THE DISCLOSURE

1. Technical Field

This disclosure relates generally to a turbine engine and, more particularly, to utilizing steam during operation of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor, and exhausted combustion products carry waste heat energy. Various systems and methods are known in the art for recovering the water vapor. Various system and methods are also known in the art for producing and utilizing steam from the recovered water vapor. While these known systems and methods have various advantages, there is still room in the art for improvement.

SUMMARY OF THE DISCLOSURE

According to an aspect of the present disclosure, an assembly is provided for a turbine engine. This assembly includes a combustor, a fuel injector nozzle and a fuel system. The combustor includes a combustion chamber. The fuel injector nozzle is configured to inject a fuel-steam mixture into the combustion chamber for combustion. The fuel system includes a fuel source, a steam source and a manifold. The manifold is configured to mix fuel received from the fuel source with steam received from the steam source to provide the fuel-steam mixture. The fuel system is configured to deliver the fuel-steam mixture to the fuel injector nozzle.

According to another aspect of the present disclosure, another assembly is provided for a turbine engine. This assembly includes a fuel source, a steam source, a manifold and a combustor section. The manifold includes an internal volume fluidly coupled with and downstream of the fuel source and the steam source. The combustor section includes a combustor and a plurality of fuel injector nozzles. The combustor includes a combustion chamber. Each of the fuel injector nozzles includes an outlet orifice and an internal passage fluidly coupled with and between the internal volume and the outlet orifice. Each of the fuel injector nozzles is configured to direct a fuel-steam mixture out of the internal passage, through the outlet orifice, for combustion within the combustion chamber.

According to still another aspect of the present disclosure, an operating method is provided for a turbine engine. This operating method includes: mixing fuel with steam to provide a fuel-steam mixture; directing the fuel-steam mixture into a fuel injector nozzle; directing the fuel-steam mixture out of the fuel injector nozzle for injection into a combustion chamber of a combustor of the turbine engine; and combusting the fuel from the fuel-steam mixture within the combustion chamber.

The operating method may also include regulating a flow of the fuel towards the fuel injector nozzle upstream of the mixing of the fuel with the steam using a control valve.

The operating method may also include regulating a flow of the fuel-steam mixture towards the fuel injector nozzle using a control valve.

The fuel system may also include a flow regulator fluidly coupled with and between the fuel source and the fuel injector nozzle.

The flow regulator may be configured as or otherwise include a control valve.

The manifold may be fluidly coupled with and between the flow regulator and the fuel injector nozzle.

The flow regulator may be configured to regulate a flow of the fuel to the manifold.

The flow regulator may be fluidly coupled with and between the manifold and the fuel injector nozzle.

The flow regulator may be configured to regulate a flow of the fuel-steam mixture to the fuel injector nozzle.

The fuel injector nozzle may include a centerline axis, a nozzle tip and an outlet orifice. The fuel injector nozzle may project axially along the centerline axis to the nozzle tip. The fuel injector nozzle may be configured to direct at least some the fuel-steam mixture out of the fuel injector nozzle through the outlet orifice along a trajectory comprising an axial component along the centerline axis.

The trajectory may include a radial component away from the centerline axis.

The fuel injector nozzle may include a centerline axis, a nozzle tip and an outlet orifice. The fuel injector nozzle may project axially along the centerline axis to the nozzle tip. The fuel injector nozzle may be configured to direct at least some the fuel-steam mixture out of the fuel injector nozzle through the outlet orifice along a trajectory comprising a radial component away from the centerline axis.

The fuel source may be configured as a non-hydrocarbon fuel source and the fuel comprises a non-hydrocarbon fuel.

The fuel source may be configured as a hydrogen fuel source and the fuel comprises hydrogen gas.

The fuel source may include a reservoir and a heater. The heater may be fluidly coupled with and between the reservoir and the manifold. The heater may be configured to heat liquid hydrogen received from the reservoir to provide the hydrogen gas.

The assembly may also include a flowpath, a condenser and an evaporator. The flowpath may project out from the combustor. The condenser may be configured to condense water vapor flowing through the flowpath downstream of the combustion chamber into water. The evaporator may be configured to evaporate at least some of the water into the steam. The steam source may be configured as or otherwise include the evaporator.

The assembly may also include a turbine engine core. The turbine engine core may include a compressor section, a combustor section and a turbine section. The combustor section may include the combustor. The flowpath may extend sequentially through the compressor section, the combustor section, the turbine section and the condenser from an inlet into the flowpath to an exhaust from the flowpath.

The flowpath may also extend through the evaporator.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 7A-C are partial schematic illustrations of fuel injector nozzles injecting a fuel-steam mixture along various trajectories.

DETAILED DESCRIPTION

Figure 1:
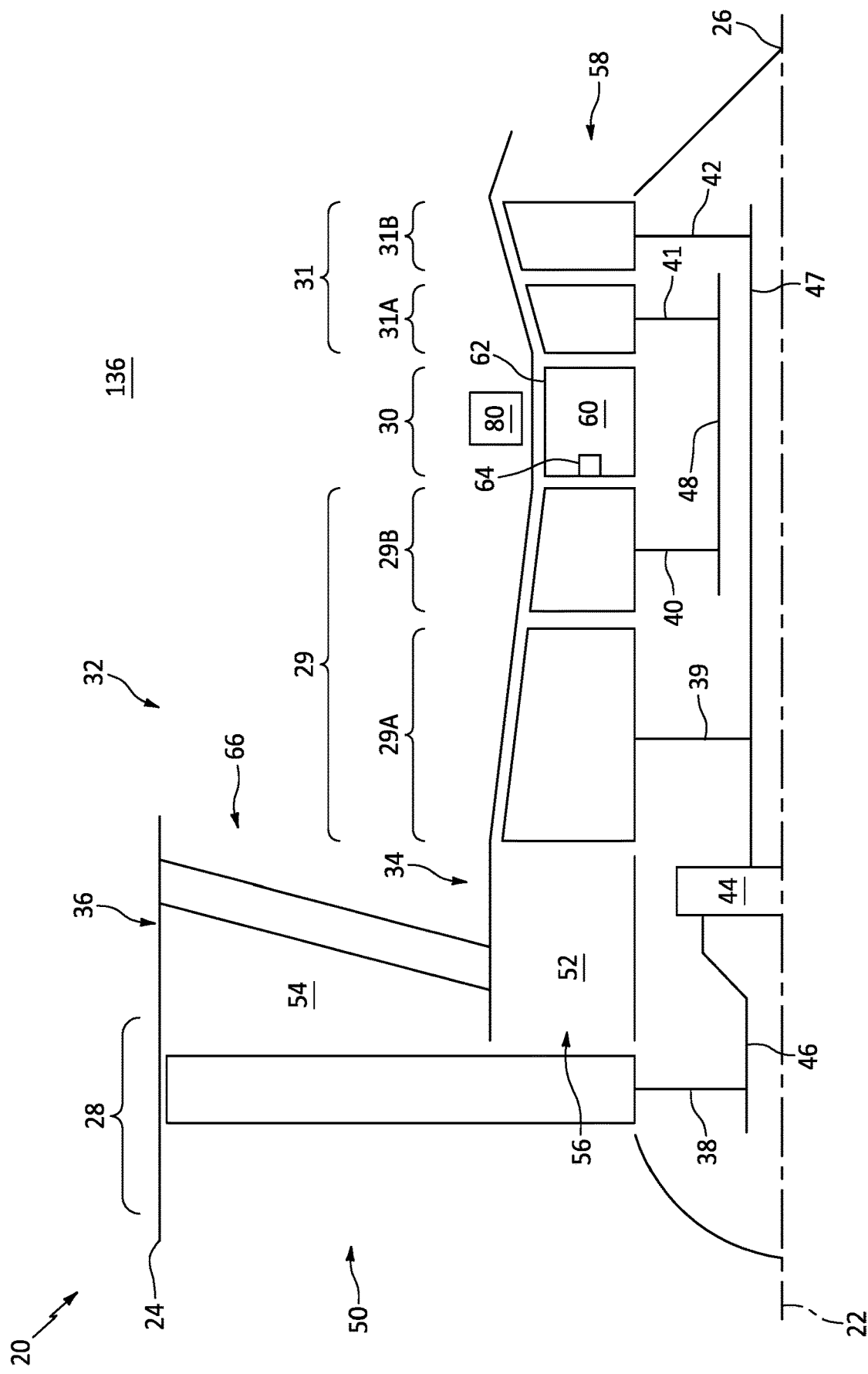
FIG. 1 is a partial side schematic illustration of a gas turbine engine.

FIG. 1 is a side sectional illustration of a gas turbine engine 20 for an aircraft propulsion system. This turbine engine 20 extends axially along an axial centerline 22 between a forward, upstream end 24 and an aft, downstream end 26. The turbine engine 20 includes a fan section 28, a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B of FIG. 1 are arranged sequentially along the axial centerline 22 within an engine housing 32; however, the present disclosure is not limited to such an exemplary arrangement. This engine housing 32 includes an inner case 34 (e.g., a core case) and an outer case 36 (e.g., a fan case). The inner case 34 may house one or more of the engine sections 29A-31B; e.g., a core of the turbine engine 20. The outer case 36 may house at least the fan section 28.

Each of the engine sections 28, 29A, 29B, 31A and 31B includes a respective bladed rotor 38-42. Each of these bladed rotors 38-42 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 38 is connected to a geartrain 44, for example, through a fan shaft 46. The geartrain 44 and the LPC rotor 39 are connected to and driven by the LPT rotor 42 through a low speed shaft 47. The HPC rotor 40 is connected to and driven by the HPT rotor 41 through a high speed shaft 48. The engine shafts 46-48 are rotatably supported by a plurality of bearings; e.g., rolling element and/or thrust bearings. Each of these bearings is connected to the engine housing 32 by at least one stationary structure such as, for example, an annular support strut.

During engine operation, air enters the turbine engine 20 through an airflow inlet 50 into the turbine engine 20. This air is directed through the fan section 28 and into a core flowpath 52 and a bypass flowpath 54. The core flowpath 52 extends sequentially through the engine sections 29A-31B (e.g., the engine core) from an inlet 56 into the core flowpath 52 to an exhaust 58 from the core flowpath 52. The air within the core flowpath 52 may be referred to as "core air". The bypass flowpath 54 extends through a bypass duct, and bypasses the engine core. The air within the bypass flowpath 54 may be referred to as "bypass air".

The core air is compressed by the LPC rotor 39 and the HPC rotor 40 and directed into a (e.g., annular) combustion chamber 60 of a (e.g., annular) combustor 62 in the combustor section 30. Fuel is injected by one or more fuel injector nozzles 64 (one visible in FIG. 1) into the combustion chamber 60 and mixed with the compressed core air to provide a fuel-air mixture. This fuel-air mixture is ignited and combustion products thereof flow through and sequentially cause the HPT rotor 41 and the LPT rotor 42 to rotate before being directed out of the turbine engine 20 through the core exhaust 58. The rotation of the HPT rotor 41 and the LPT rotor 42 respectively drive rotation of the HPC rotor 40 and the LPC rotor 39 and, thus, compression of the air received from the core inlet 56. The rotation of the LPT rotor 42 also drives rotation of the fan rotor 38, which propels the bypass air through the bypass flowpath 54 and out of the turbine engine 20 through an exhaust 66 from the bypass flowpath 54. The propulsion of the bypass air may account for a majority of thrust generated by the turbine engine 20.

The fuel injected into the combustion chamber 60 for combustion may be a non-hydrocarbon fuel; e.g., a hydrocarbon free fuel. Examples of the non-hydrocarbon fuel include, but are not limited to, hydrogen fuel (e.g., hydrogen ($H_2$) gas), ammonia fuel (e.g., ammonia ($NH_3$) gas), and ammonia-derived fuels such as mixtures of hydrogen, nitrogen and ammonia after cracking of some ammonia fuel. This non-hydrocarbon fuel may have a relatively quick flame speed when compared, for example, to a traditional hydrocarbon fuel. The relatively quick flame speed may provide the non-hydrocarbon fuel, particularly the hydrogen fuel, with a higher propensity for flame flashback if unmitigated. Therefore, to mitigate (e.g., reduce or eliminate) this propensity for flame flashback, the fuel of the present disclosure is injected from the injector nozzles 64 with steam. More particularly, the steam is mixed with the fuel such that a mixture of the fuel and steam ("fuel-steam mixture") is directed out of the injector nozzles 64 for combustion of the fuel within the combustion chamber 60.

The inclusion of the steam with the fuel may effectively increase a mass of the fuel being injected into the combustion chamber 60. By increasing the mass of the fuel, the momentum of the fuel may also be increased. Increasing fuel momentum may increase penetration of the fuel into the combustion chamber 60 prior to combustion, which may reduce or eliminate flashback. Increasing penetration of the fuel into the combustion chamber 60 may also facilitate increased mixing with the air, which may increase combustion efficiency. In addition, injecting the steam with the fuel into the combustion chamber 60 may facilitate a reduction in flame temperature within the combustor 62, which may reduce nitric oxide (NOx) production.

While the fuel is described above as non-hydrocarbon fuel, the present disclosure is not limited thereto. The steam, for example, may also or alternatively be mixed with a hydrocarbon fuel for injection into the combustion chamber 60 as the fuel-steam mixture. Examples of the hydrocarbon fuel include, but are not limited to, kerosene and jet fuel. However, for ease of description, the fuel may be described below as the non-hydrocarbon fuel and, more particularly, as the hydrogen fuel; e.g., hydrogen ($H_2$) gas.

Figure 2:
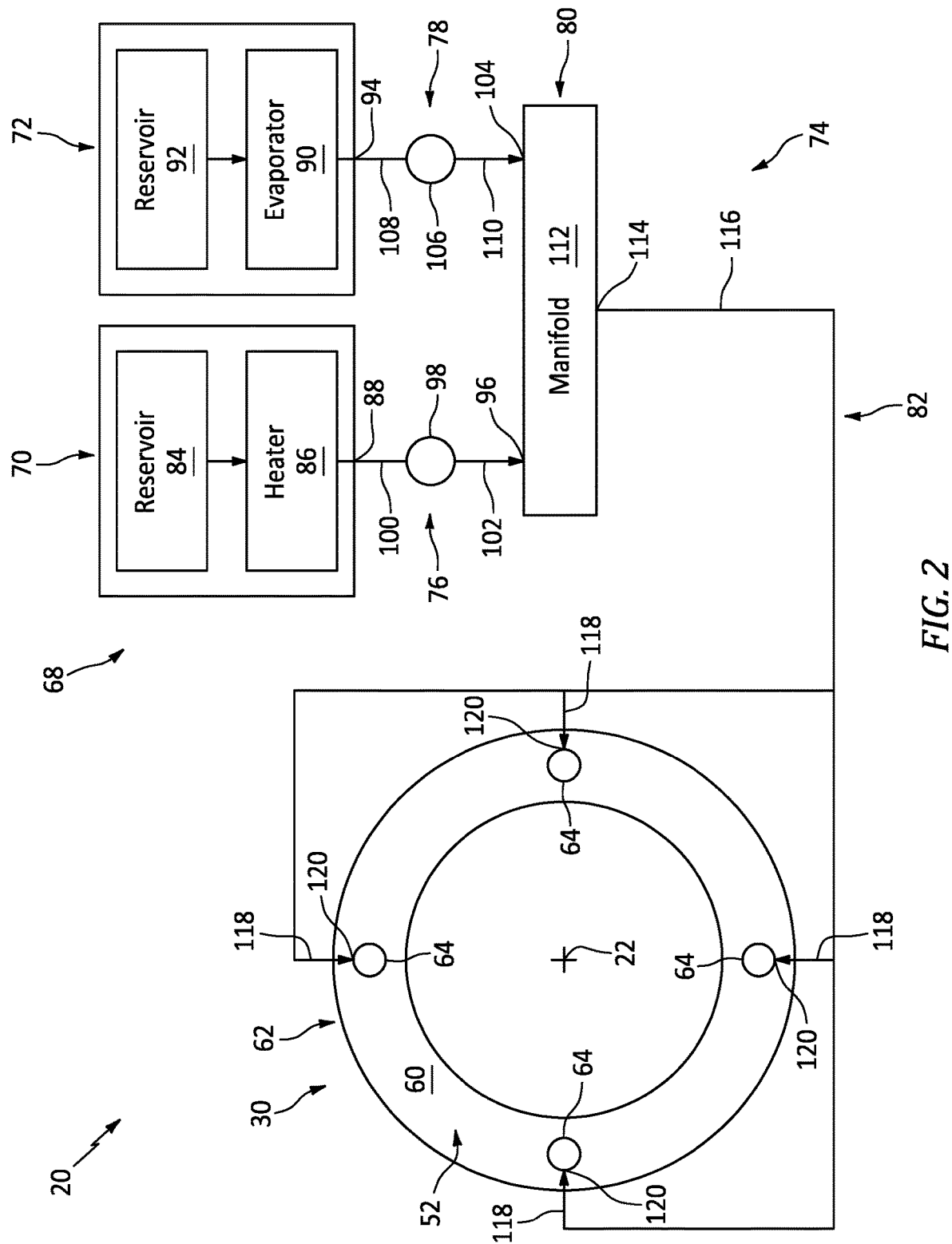
FIG. 2 is a schematic illustration of a fuel system arranged with a combustor section of the turbine engine.

Referring to FIG. 2, the turbine engine 20 includes a fuel system 68 for delivering the fuel-steam mixture (e.g., the hydrogen gas-steam mixture) to the one or more injector nozzles 64. This fuel system 68 includes a fuel source 70, a steam source 72 and a fuel delivery circuit 74. The fuel delivery circuit 74 includes a fuel circuit 76, a steam circuit 78, a manifold 80 and a fuel-steam mixture circuit 82.

The fuel source 70 is configured to provide the fuel to the fuel delivery circuit 74 and, more particularly, to the fuel circuit 76 during turbine engine operation. The fuel source 70 may also be configured to store the fuel (e.g., the hydrogen fuel) before, during and/or after turbine engine operation. The fuel source 70, for example, may be configured as or otherwise includes a fuel reservoir 84. Examples of the fuel reservoir 84 include, but are not limited to, a tank, a cylinder, a pressure vessel, a bladder or any other type of fuel storage container.

The fuel source 70 may also include a fuel heater 86 arranged between the fuel reservoir 84 and an outlet 88 from the fuel source 70. Where the fuel (e.g., the hydrogen fuel) is stored within the fuel reservoir 84 in a liquid form or in a liquid and gas form, the fuel heater 86 may be configured to heat the liquid fuel to evaporate that liquid fuel into gaseous fuel. The fuel heater 86, for example, may evaporate liquid hydrogen received from the fuel reservoir 84 to provide hydrogen gas. Examples of the fuel heater 86 include, but are not limited to, an electric heater and an evaporator. Where the fuel heater 86 is an evaporator, this evaporator may transfer heat energy from a heat exchange (HX) fluid into the fuel to heat and evaporate the fuel into its gaseous form. Examples of the HX fluid include, but are not limited to, engine lubricant, the core air bleed from the compressor section 29 (see FIG. 1), the bypass air bled from the bypass flowpath 54 (see FIG. 1), the combustion products bled downstream from or downstream of the turbine section 31 (see FIG. 1), and aircraft cabin air.

The gaseous fuel may be provided directly to the fuel delivery circuit 74 from the fuel source 70 without intermediate storage thereof. The gaseous fuel, however, may alternatively be (e.g., temporarily) stored during turbine engine operation. This storage of the gaseous fuel may accommodate fluctuations in the evaporation of the fuel from the liquid phase to the gaseous phase. The fuel source 70, for example, may include a gaseous fuel accumulator or other container fluidly coupled between the heater 86 and the outlet 88 from the fuel source 70.

The steam source 72 is configured to provide the steam to the fuel delivery circuit 74 and, more particularly, to the steam circuit 78 during turbine engine operation. The steam source 72, for example, may be configured as or otherwise include an evaporator 90. This evaporator 90 is configured to evaporate water into the steam during turbine engine operation. The water may be received from various sources. The steam source 72 of FIG. 2, for example, also includes a water reservoir 92 fluidly coupled with and upstream of the evaporator 90. This water reservoir 92 is configured to store the water before, during and/or after turbine engine operation. Examples of the water reservoir 92 include, but are not limited to, a tank, a cylinder, a pressure vessel, a bladder or any other type of water storage container.

The steam generated by the steam source 72 may be provided directly to the fuel delivery circuit 74 without intermediate storage thereof. The steam, however, may alternatively be (e.g., temporarily) stored during turbine engine operation. This storage of the steam may accommodate fluctuations in the steam generation. The steam source 72, for example, may include a steam accumulator or other container fluidly coupled between the evaporator 90 and an outlet 94 from the steam source 72.

The fuel circuit 76 is configured to deliver the fuel received from (e.g., output by) the fuel source 70 to the manifold 80. The fuel circuit 76 of FIG. 2, for example, extends between and to the fuel source outlet 88 and an outlet 96 from the fuel circuit 76. This fuel circuit 76 provides a passage that fluidly couples the fuel source 70 to the manifold 80. The fuel circuit passage may be formed by one or more conduits such as, but not limited to, pipes, hoses and tubes. The fuel circuit passage may also or alternatively be formed by one or more internal apertures, channels, cavities, etc. of one or more fluid devices. The fuel circuit 76 of FIG. 2, for example, includes a fuel flow regulator 98 fluidly coupled with and inline between an upstream conduit 100 and a downstream conduit 102. The upstream conduit 100 fluidly couples an inlet into the fuel flow regulator 98 to the fuel source outlet 88. The downstream conduit 102 fluidly couples an outlet from the fuel flow regulator 98 to the fuel circuit outlet 96. The fuel flow regulator 98 may be configured as or otherwise include a control valve or any other device operable to selectively direct (e.g., regulate) a flow of the fuel from the fuel source 70 to the manifold 80.

The steam circuit 78 is configured to deliver the steam received from (e.g., output by) the steam source 72 to the manifold 80. The steam circuit 78 of FIG. 2, for example, extends between and to the steam source outlet 94 and an outlet 104 from the steam circuit 78. This steam circuit 78 provides a passage that fluidly couples the steam source 72 to the manifold 80. The steam circuit passage may be formed by one or more conduits such as, but not limited to, pipes, hoses and tubes. The steam circuit passage may also or alternatively be formed by one or more internal apertures, channels, cavities, etc. of one or more fluid devices. The steam circuit 78 of FIG. 2, for example, includes a steam flow regulator 106 fluidly coupled with and inline between an upstream conduit 108 and a downstream conduit 110. The upstream conduit 108 fluidly couples an inlet into the steam flow regulator 106 to the steam source outlet 94. The downstream conduit 110 fluidly couples an outlet from the steam flow regulator 106 to the steam circuit outlet 104. The steam flow regulator 106 may be configured as or otherwise include a control valve or any other device operable to selectively direct (e.g., regulate) a flow of the steam from the steam source 72 to the manifold 80.

Figure 3:
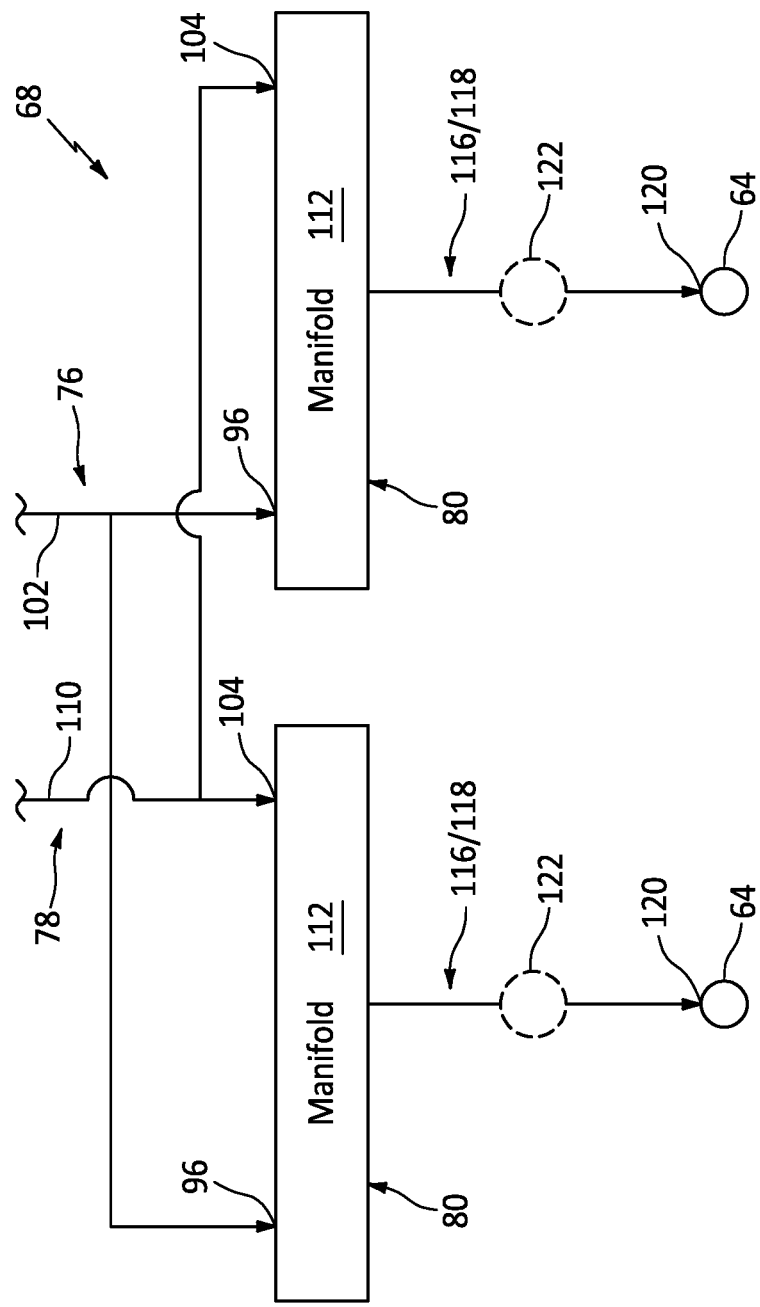
FIG. 3 is a partial schematic illustration of the fuel system with multiple manifolds.

The manifold 80 is configured to fluidly couple the fuel circuit 76 and the steam circuit 78 (e.g., in parallel) to the mixture circuit 82. The manifold 80 of FIG. 2, for example, includes an internal volume 112 (e.g., cavity, a chamber, a passage, etc.) which is fluidly coupled with the fuel circuit outlet 96, the steam circuit outlet 104 and an inlet 114 to the mixture circuit 82. The internal volume 112 of FIG. 3 is between (a) the fuel circuit outlet 96 and the steam circuit outlet 104 and (b) the mixture circuit inlet 114. Examples of the internal volume 112 include, but are not limited to, a cavity, a chamber and a passage. With the foregoing arrangement, the manifold 80 is configured to: receive the fuel (e.g., hydrogen gas) from the fuel source 70 through the fuel circuit 76; receive the steam from the steam source 72 through the steam circuit 78; and facilitate mixing of the fuel with the steam within the internal volume 112 to provide the fuel-steam mixture. The manifold 80 is also configured to provide the fuel-steam mixture to the mixture circuit 82.

The manifold 80 of FIG. 2 is (e.g., physically and/or spatially) discrete from the injector nozzles 64. The manifold 80, for example, may be arranged outside the combustor 62 and, more generally, outside of the combustor section 30. The manifold 80 of FIG. 1, for example, is arranged outside of the inner case 34 housing the combustor section 30 and/or surrounding the combustor 62. The present disclosure, however, is not limited to such an exemplary arrangement. The manifold 80, for example, may alternatively be disposed inside of the inner case 34 or otherwise with the turbine engine 20.

The mixture circuit 82 of FIG. 2 is configured to deliver the fuel-steam mixture received from the manifold 80 to the one or more injector nozzles 64. The mixture circuit 82 of FIG. 2, for example, includes an input leg 116 and one or more output legs 118, where each output leg 118 is associated with a respective one of the injector nozzles 64. The input leg 116 of FIG. 2 extends from the mixture circuit inlet 114 to an interface with the output legs 118, where the output legs 118 may be fluidly coupled in parallel to the input leg 116. Each of the output legs 118 extends from the interface to a respective outlet 120 from the mixture circuit 82 and its respective output leg 118. Each mixture circuit outlet 120 is fluidly coupled with a respective one of the injector nozzles 64. With this arrangement, the (e.g., single) manifold 80 may facilitate mixing of the fuel and the steam for and provide the fuel-steam mixture to each of the injector nozzles 64. However, referring to FIG. 3, each injector nozzle 64 or a subset of the injector nozzles 64 may alternatively be associated with a discrete manifold 80.

Figure 4:
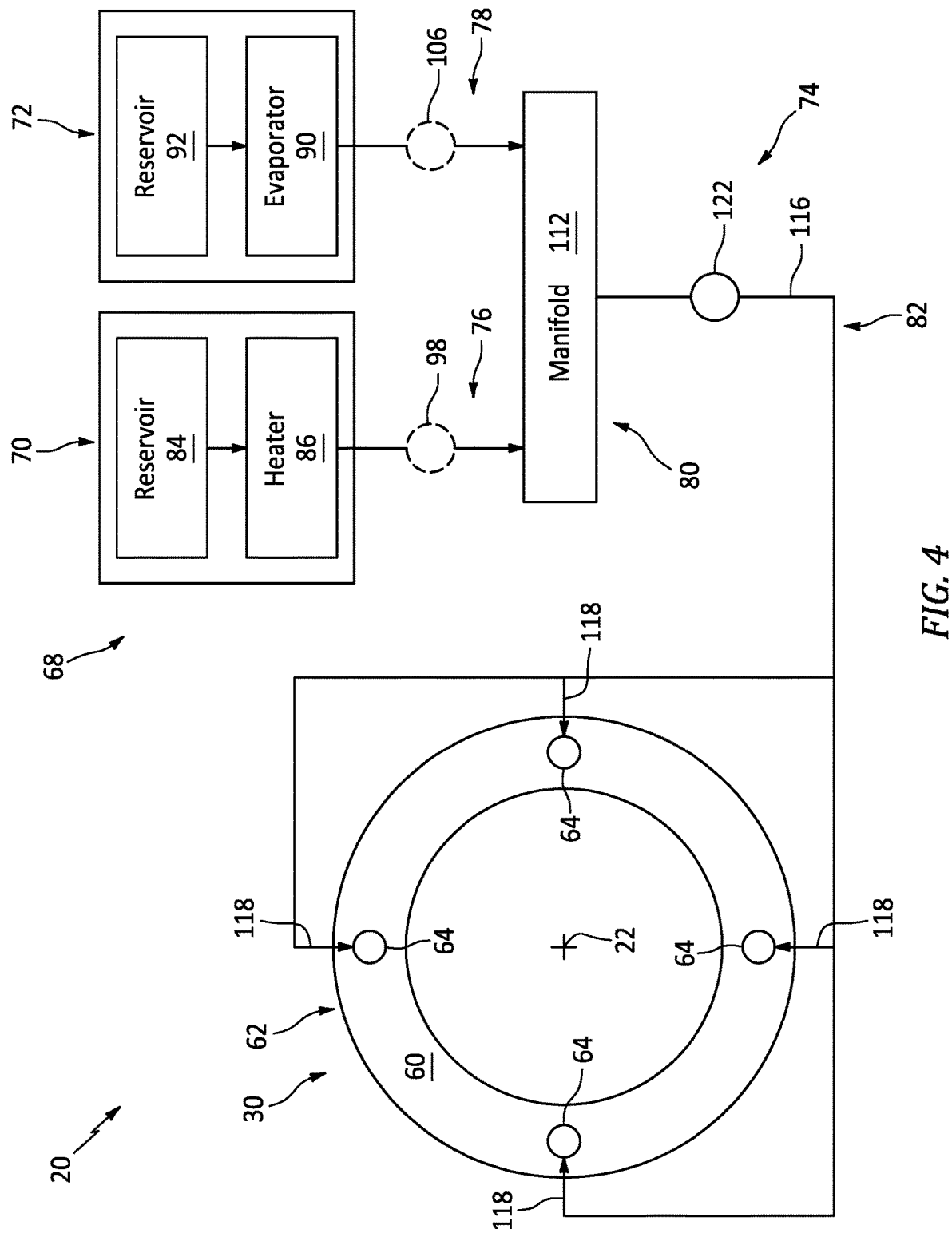
FIG. 4 is a schematic illustration of the fuel system and the combustor section with another flow regulator.

In some embodiments, referring to FIG. 4, the mixture circuit 82 may include a fuel-steam mixture flow regulator 122; e.g., a control valve. While the mixture flow regulator 122 of FIG. 4 is arranged with the input leg 116, it is contemplated each output leg 118 may alternatively be arranged with its own fuel-steam mixture flow regulator 122. The mixture flow regulator 122 may be configured as or otherwise include a control valve or any other device operable to selectively direct (e.g., regulate) a flow of the fuel-steam mixture from the manifold 80 to the injector nozzle(s) 64. Where the fuel delivery circuit 74 includes the mixture flow regulator 122, the fuel flow regulator 98 and/or the steam flow regulator 106 may be omitted.

Figure 5:
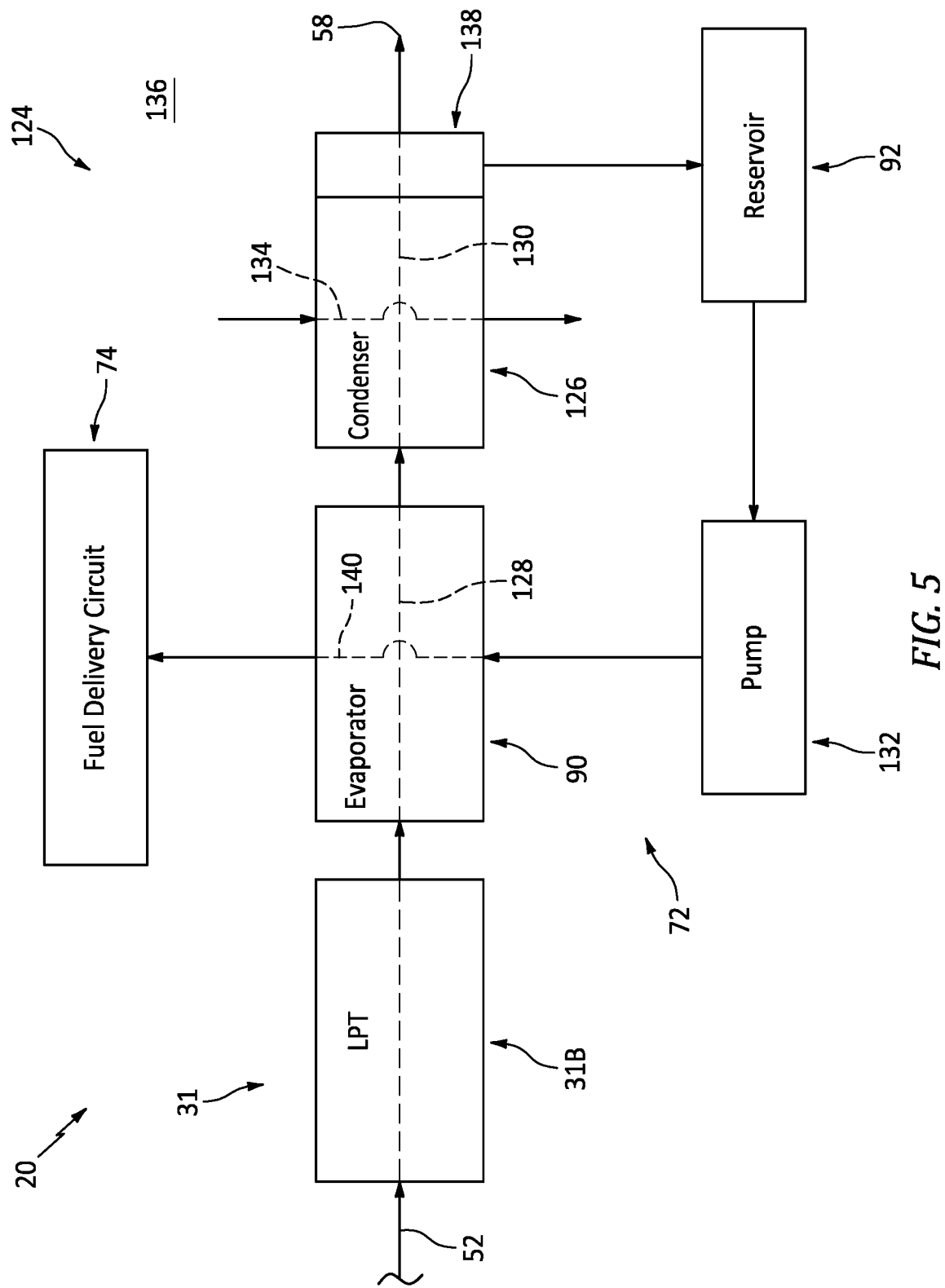
FIG. 5 is a schematic illustration of a water recovery system arranged with a core flowpath.

Referring to FIG. 5, the turbine engine 20 may include a water recovery system 124 for recovering water from the combustion products and providing the water to the steam source 72. The water recovery system 124 of FIG. 5 includes the evaporator 90 and a condenser 126. The evaporator 90 and the condenser 126 are fluidly coupled inline with the core flowpath 52. For example, the core flowpath 52 of FIG. 5 extends from the LPT section 31B, sequentially through a gas (e.g., combustion products) flowpath 128 of the evaporator 90 and a gas (e.g., combustion products) flowpath 130 of the condenser 126 (or vice versa), to the core exhaust 58. The water recovery system 124 of FIG. 5 also includes the water reservoir 92 and a water flow regulator 132 (e.g., a pump and/or a valve).

During operation of the water recovery system 124, a relatively cool heat exchange (HX) fluid is directed into a fluid flowpath 134 of the condenser 126. Examples of the HX fluid include, but are not limited to, a refrigerant, the fuel, the bypass gas bleed from the bypass flowpath 54 (see FIG. 1), and ambient air bleed from an environment 136 external to the turbine engine 20. The relatively hot combustion products, including water vapor, are directed into the condenser gas flowpath 130. The condenser 126 exchanges heat energy between the HX fluid flowing within the condenser fluid flowpath 134 and the combustion products flowing within the condenser gas flowpath 130. The combustion products flowing within the condenser gas flowpath 130 are typically warmer than the HX fluid flowing within the condenser fluid flowpath 134. The condenser 126 is thereby operable to cool the combustion products using the HX fluid. This cooling of the combustion products may condense at least some of the water vapor (e.g., the gaseous water) flowing within the condenser gas flowpath 130 into liquid water droplets. At least some or all of the liquid water may be collected and separated from the remaining gaseous combustion products by a water separator 138 and subsequently directed to the water reservoir 92 for (e.g., temporary) storage. Here, the water separator 138 is configured as or otherwise includes a gutter paired with the condenser 126. However, various other types of separators are known in the art, and the present disclosure is not limited to any particular ones thereof.

The water flow regulator 132 directs the water from the water reservoir 92 into and through a fluid flowpath 140 of the evaporator 90. The relatively hot combustion products are further directed through the evaporator gas flowpath 128, for example, prior to flowing through the condenser gas flowpath 130. The evaporator 90 exchanges heat energy between the water flowing within the evaporator fluid flowpath 140 and the combustion products flowing within the evaporator gas flowpath 128. The combustion products flowing within the evaporator gas flowpath 128 are typically warmer than the liquid water flowing into the evaporator fluid flowpath 140. The evaporator 90 is thereby operable to heat the water using the combustion products and recuperate heat energy from the combustion products. This heating of the water may evaporate at least some or all of the liquid water flowing within the evaporator fluid flowpath 140 into gaseous water—the steam. At least some (or all) of this steam is provided to the fuel delivery circuit 74 for mixing with the fuel as described above. The present disclosure, however, is not limited to the foregoing exemplary water recovery system arrangement. Furthermore, in other embodiments, it is contemplated the water recovery system 124 may be omitted where the water reservoir 92 of FIG. 5 is large enough to contain enough water for a flight or one or more select maneuvers.

Figure 6:
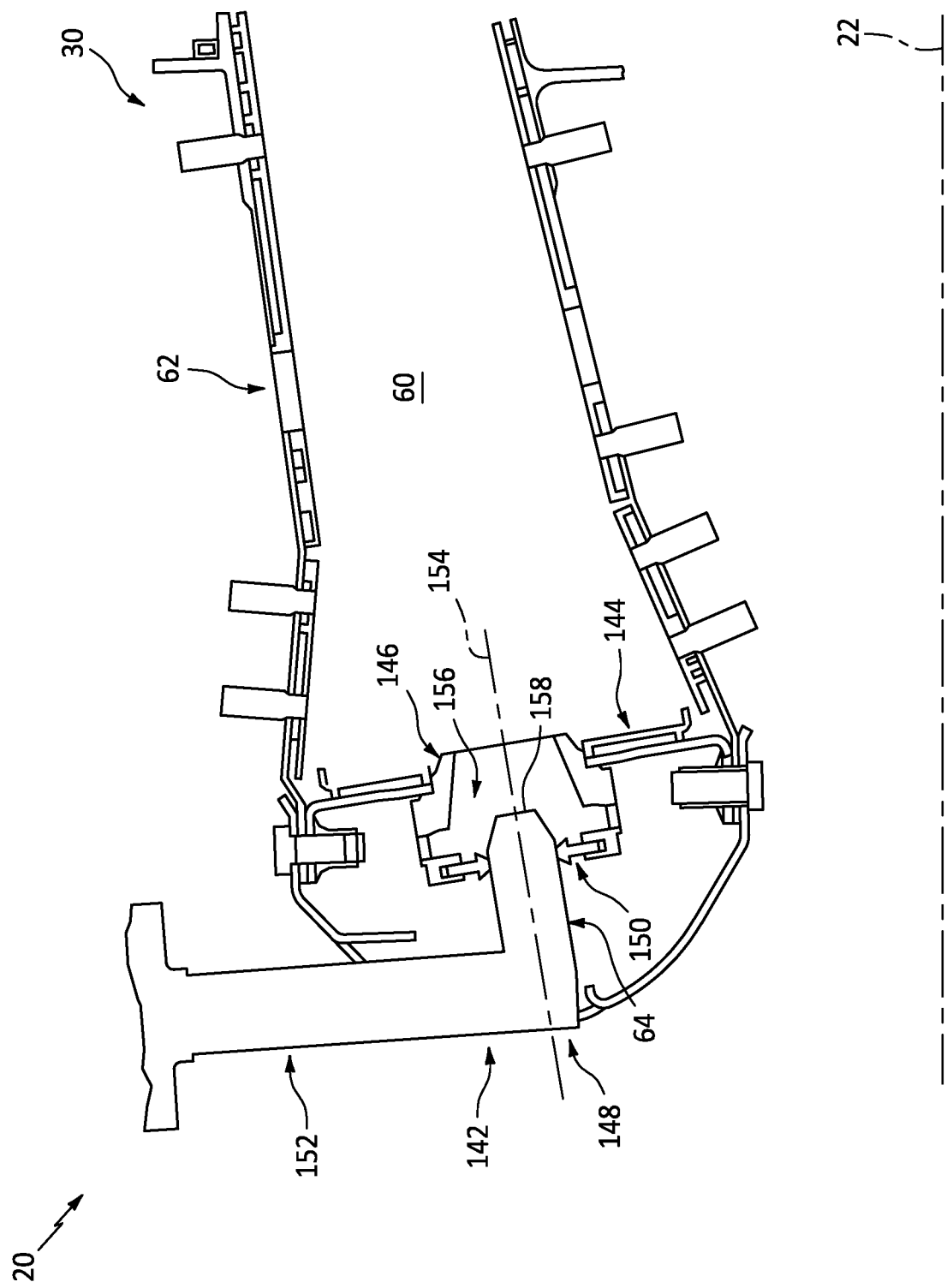
FIG. 6 is a partial sectional illustration of the combustor section.

Referring to FIG. 6, each of the injector nozzles 64 may be included in a respective fuel injector assembly 142. These fuel injector assemblies 142 (one visible in FIG. 6) are arranged circumferentially about the axial centerline 22 in a circular array. The fuel injector assemblies 142 may be mounted to a (e.g., annular) bulkhead 144 of the combustor 62. Each fuel injector assembly 142 is configured to direct a mixture of fuel (here, the fuel-steam mixture) and compressed air into the combustion chamber 60 for combustion. Each fuel injector assembly 142 of FIG. 6 includes an air swirler structure 146 and a fuel injector 148. The fuel injector assembly 142 of FIG. 6 also includes a nozzle guide 150 (e.g., a guide plate, a slider, a nozzle mount, etc.) movably coupling the fuel injector 148 to the air swirler structure 146, where the air swirler structure 146 may be fixedly mounted to the combustor bulkhead 144. However, various other fuel injector mounting techniques are known in the art, and the present disclosure is not limited to any particular ones thereof.

The fuel injector 148 of FIG. 6 includes a fuel injector stem 152 and the injector nozzle 64. The injector stem 152 is configured to support and route the fuel-steam mixture to the injector nozzle 64. However, in other embodiments, the injector stem 152 may be configured to route the fuel and the steam independently towards the injector nozzle 64 where, for example, the manifold 80 is disposed in the fuel injector 148; e.g., in the injector stem 152 or otherwise. Referring again to FIG. 6, the injector nozzle 64 is cantilevered from the injector stem 152. The injector nozzle 64 projects along an axis 154 (e.g., a centerline of the injector nozzle 64 and/or the air swirler structure 146) partially into an inner bore 156 of the air swirler structure 146. A tip 158 of the injector nozzle 64 is thereby disposed within the inner bore 156.

Referring to FIGS. 7A-C, the injector nozzle 64 includes at least (or only) one internal passage 160 and one or more outlet orifices 162 (one visible in FIGS. 7A-C) arranged at (e.g., on, adjacent or proximate) the nozzle tip 158. The internal passage 160 may be annular. The internal passage 160 extends (e.g., axially along the centerline axis 154) within the injector nozzle 64 to one or more of the outlet orifices 162. This internal passage 160 is fluidly coupled with and downstream of the fuel delivery circuit 74 and a respective one of its output legs 118 (see FIG. 2). The internal passage 160 is thereby operable to direct the fuel-steam mixture within (e.g., through) the injector nozzle 64 to the one or more outlet orifices 162.

The outlet orifice 162 may be arranged circumferentially about the centerline axis 154 in an annular array; e.g., a circular array. The injector nozzle 64 is configured to direct the fuel-steam mixture out of the fuel injector 148 through the outlet orifice(s) 162 for injection into the combustion chamber 60. The fuel-steam mixture may be directed out of each outlet orifice 162 as a jet or spray along a respective trajectory. Referring to FIG. 7A, the trajectory associated with one or more of the outlet orifices 162 may primarily (or only) include a radial component away from the centerline axis 154; e.g., see radial trajectory line 164A. Referring to FIG. 7B, the trajectory associated with one or more of the outlet orifices 162 may primarily (or only) include an axial component along the centerline axis 154; e.g., see axial trajectory line 164B. Referring to FIG. 7C, the trajectory associated with one or more of the outlet orifices 162 may include (a) a radial component away from the centerline axis 154 and (b) an axial component along the centerline axis 154; e.g., see canted (e.g., radial and axial) trajectory line 164C. The present disclosure, however, is not limited to the foregoing exemplary injector nozzle configurations.

The fuel system 68 may be included in various turbine engines other than the one described above. The fuel system 68, for example, may be included in a geared turbine engine where a geartrain connects one or more shafts to one or more rotors in a fan section, a compressor section and/or any other engine section. Alternatively, the fuel system 68 may be included in a turbine engine configured without a geartrain; e.g., a direct drive turbine engine. The fuel system 68 may be included in a turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
an annular combustor comprising an annular combustion chamber;
a fuel injector nozzle configured to inject a fuel-steam mixture into the annular combustion chamber for combustion; and
a fuel system including a non-hydrocarbon fuel source, a steam source and a manifold, the steam source including a water reservoir fluidly coupled to an evaporator, the manifold configured to mix a non-hydrocarbon fuel received from the non-hydrocarbon fuel source with steam received from the steam source to provide the fuel-steam mixture, and the fuel system configured to deliver the fuel-steam mixture to the fuel injector nozzle,
wherein the non-hydrocarbon fuel comprises hydrogen gas.

2. The assembly of claim 1, wherein the fuel system further includes a flow regulator fluidly coupled with and between the non-hydrocarbon fuel source and the fuel injector nozzle.

3. The assembly of claim 2, wherein the flow regulator comprises a control valve.

4. The assembly of claim 2, wherein the manifold is fluidly coupled with and between the flow regulator and the fuel injector nozzle.

5. The assembly of claim 2, wherein the flow regulator is configured to regulate a flow of the fuel to the manifold.

6. The assembly of claim 3, wherein the flow regulator is fluidly coupled with and between the manifold and the fuel injector nozzle.

7. The assembly of claim 3, wherein the flow regulator is configured to regulate a flow of the fuel-steam mixture to the fuel injector nozzle.

8. The assembly of claim 1, wherein
the fuel injector nozzle includes a centerline axis, a nozzle tip and an outlet orifice;
the fuel injector nozzle projects axially along the centerline axis to the nozzle tip; and
the fuel injector nozzle is configured to direct at least some the fuel-steam mixture out of the fuel injector nozzle through the outlet orifice along a trajectory comprising an axial component along the centerline axis.

9. The assembly of claim 8, wherein the trajectory further comprises a radial component away from the centerline axis.

10. The assembly of claim 1, wherein
the fuel injector nozzle includes a centerline axis, a nozzle tip and an outlet orifice;
the fuel injector nozzle projects axially along the centerline axis to the nozzle tip; and
the fuel injector nozzle is configured to direct at least some the fuel-steam mixture out of the fuel injector nozzle through the outlet orifice along a trajectory comprising a radial component away from the centerline axis.

11. The assembly of claim 1, wherein
the non-hydrocarbon fuel source includes a reservoir and a heater;
the heater is fluidly coupled with and between the reservoir and the manifold; and
the heater is configured to heat liquid hydrogen received from the reservoir to provide the hydrogen gas.

12. The assembly of claim 1, further comprising:
a flowpath projecting out from the annular combustor; and
a condenser configured to condense water vapor flowing through the flowpath downstream of the annular combustion chamber into water;
wherein the evaporator is configured to evaporate at least some of the water into the steam.

13. The assembly of claim 12, further comprising:
a turbine engine core including a compressor section, a combustor section and a turbine section;
the combustor section comprising the annular combustor; and
the flowpath extending sequentially through the compressor section, the combustor section, the turbine section and the condenser from an inlet into the flowpath to an exhaust from the flowpath.

14. The assembly of claim 13, wherein the flowpath further extends through the evaporator.

15. An assembly for a turbine engine, comprising:
a non-hydrocarbon fuel source;
a steam source including a water reservoir fluidly coupled to an evaporator;
a manifold comprising an internal volume fluidly coupled with and downstream of the non-hydrocarbon fuel source and the steam source, the manifold configured to receive a non-hydrocarbon fuel from the non-hydrocarbon fuel source and the manifold configured to mix the non-hydrocarbon fuel with steam received from the steam source to provide the fuel-steam mixture; and
a combustor section including an annular combustor and a plurality of fuel injector nozzles, the annular combustor comprising an annular combustion chamber, each of the plurality of fuel injector nozzles including an outlet orifice and an internal passage fluidly coupled with and between the internal volume and the outlet orifice, and each of the plurality of fuel injector nozzles configured to direct the fuel-steam mixture out of the internal passage, through the outlet orifice, for combustion within the annular combustion chamber,
wherein the non-hydrocarbon fuel source is a gas fuel source and the non-hydrocarbon fuel comprises hydrogen gas.

* * * * *